July 29, 1969     H. F. FLOWERS     3,457,878
TILTING DUMP CAR DOOR HINGE

Filed June 11, 1965     3 Sheets-Sheet 1

INVENTOR
HENRY FORT FLOWERS

BY
*Mason, Porter, Diller & Brown*
ATTORNEYS

July 29, 1969
H. F. FLOWERS
3,457,878
TILTING DUMP CAR DOOR HINGE
Filed June 11, 1965
3 Sheets-Sheet 2
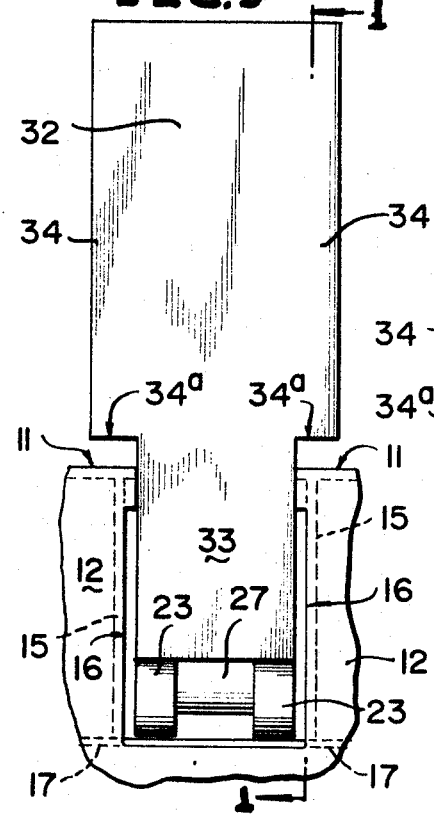
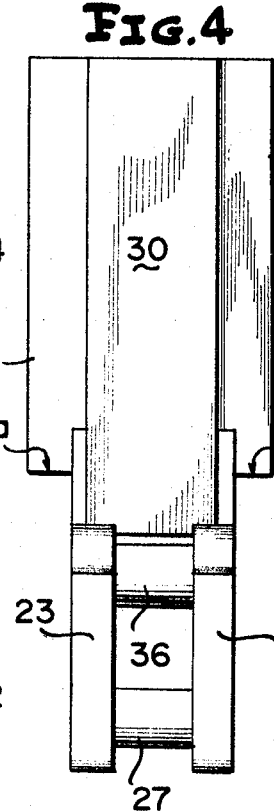
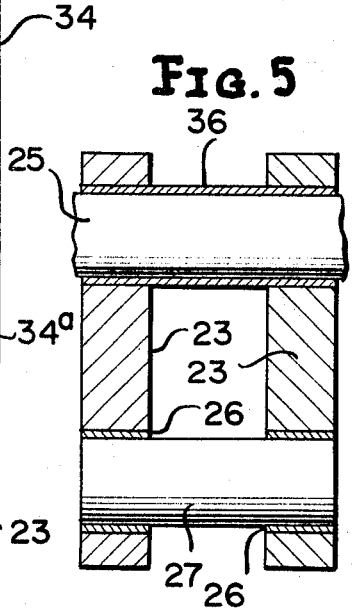
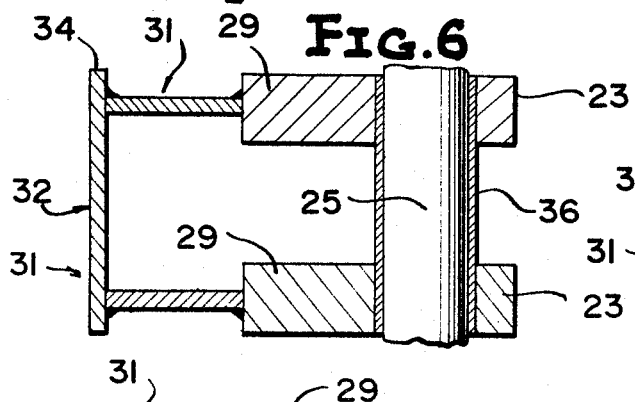
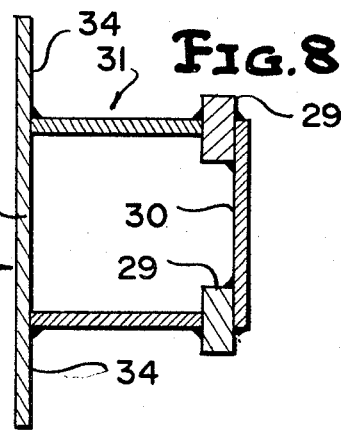
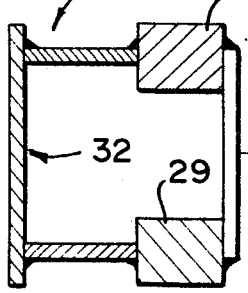
INVENTOR
HENRY FORT FLOWERS
BY
Mason, Porter, Diller & Brown
ATTORNEYS July 29, 1969 — H. F. FLOWERS — 3,457,878
TILTING DUMP CAR DOOR HINGE
Filed June 11, 1965 — 3 Sheets-Sheet 3

INVENTOR
HENRY FORT FLOWERS
ATTORNEYS

United States Patent Office 3,457,878
Patented July 29, 1969

3,457,878
TILTING DUMP CAR DOOR HINGE
Henry Fort Flowers, 3023 Del Monte Drive,
Houston, Tex. 77019
Filed June 11, 1965, Ser. No. 463,137
Int. Cl. B61d 9/02
U.S. Cl. 105—276                                          3 Claims

ABSTRACT OF THE DISCLOSURE

An improvement is provided in a railway dump vehicle, and in particular for a side discharge thereof. A rigid door hinge is provided, secured to a vehicle side door, the door hinge comprising a box structure to which are secured parallel hinge bosses which facilitate pivoting of the box structure, and consequently the side door, upon a desired movement of an operating arm, such that the side door is pivotal into a position generally co-planar with a bottom of the tilted vehicle, to facilitate emptying of the vehicle contents. A stop is provided, associated with the box structure, comprising abutment shoulders, for limiting the pivotal movement thereof.

---

The invention for which the following is an exemplary description, relates to a box mounting for the door hinge of a side discharge dump vehicle. Such vehicles either for railway track or roadway use are generally constructed of welded sheet metal plates and forms. Modern practice tends to emphasize light weight construction wherever possible. However, in providing such light weight construction it is necessary to maintain adequate rigidity. This is especially true of the down turning side doors. Some means must be provided to compensate for the light weight of the structural elements, so that the doors may stand the heavy wear imposed by a load of loose material and the severe conditions existing during the discharge operation.

One object of the invention is to provide a downturning side door of relatively light weight combined with heavy reinforcing box portions by which the door is held in closed position and readily tilted into a discharge position in which the lading is discharged.

It is a further object of the invention to limit the opening of the door to a discharge position of maximum efficiency at the greatest distance from the track or road surface on which the vehicle stands.

Another object of the invention is to provide novel hinge portions heavy enough to compensate for the light weight construction of the door proper.

A further object of the invention is to provide increased support and stiffening for the door.

With the above and other objects in view that will hereinafter appear, the nature of the invention will be more clearly understood by reference to the following detailed description, the appended claims and the several views illustrated in the accompanying drawings.

FIGURE 3 is a fragmentary outside elevation illustrating a portion of the door and associated vehicle body parts.

FIGURE 4 is a fragmentary inside elevation illustrating the hinge.

FIGURE 5 is a cross-sectional view taken on the line 5—5 of FIGURE 1.

FIGURE 6 is a cross-sectional view taken on the line 6—6 of FIGURE 1.

FIGURE 7 is a similar sectional view taken on the line 7—7 of FIGURE 1.

FIGURE 8 is a similar sectional view taken on the line 8—8 of FIGURE 1.

Figure 2:
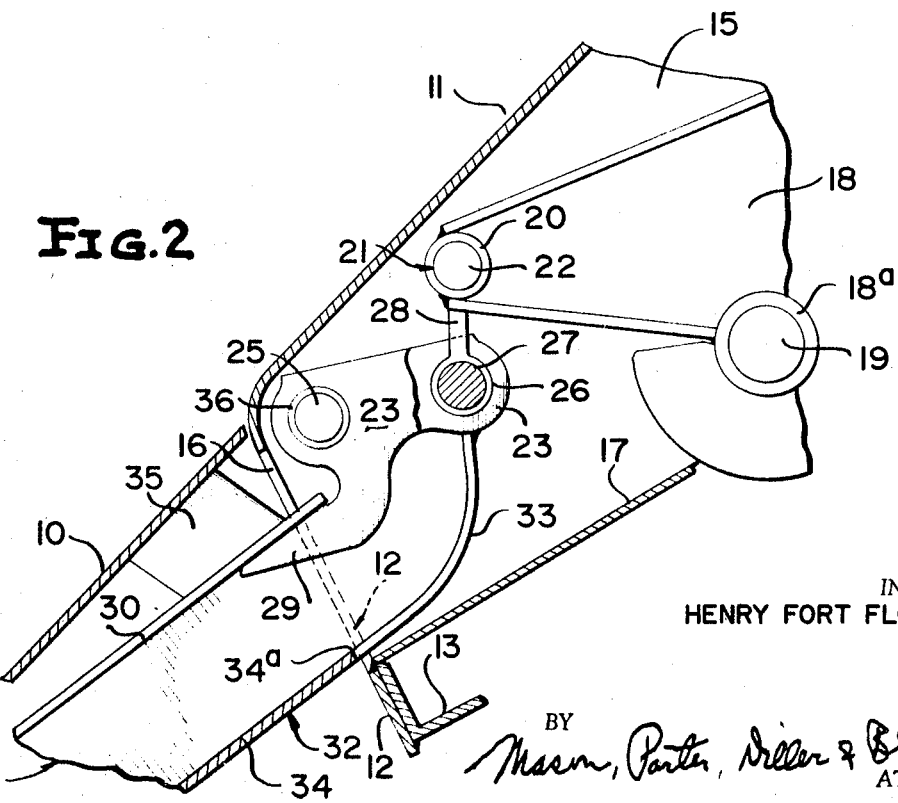
FIGURE 2 is a section similar to FIGURE 1, also taken on the line 1—1 of FIGURE 3 with the door being shown in the open position.

Briefly described, the invention consists of a dump vehicle 5 (FIGURE 9) having side door construction 10 capable of down-turning for discharge purposes, and controlled in its outward or lading discharging position, so that the door forms a continuation of the plane of the tilted body of the vehicle, generally as shown in FIGURE 2. It is possible to use light weight steel or other metallic construction for the door proper by providing that at each hinge point, the side doors are adequately braced by a box construction. This box construction is utilized also both to limit the outward movement of the door and to carry hinge members of relatively heavier construction which will supply the necessary rigidity to the door. Thus the strength of the hinge members is not diminished by the selection of lighter weight materials for the door and the box mounting.

Figure 1:
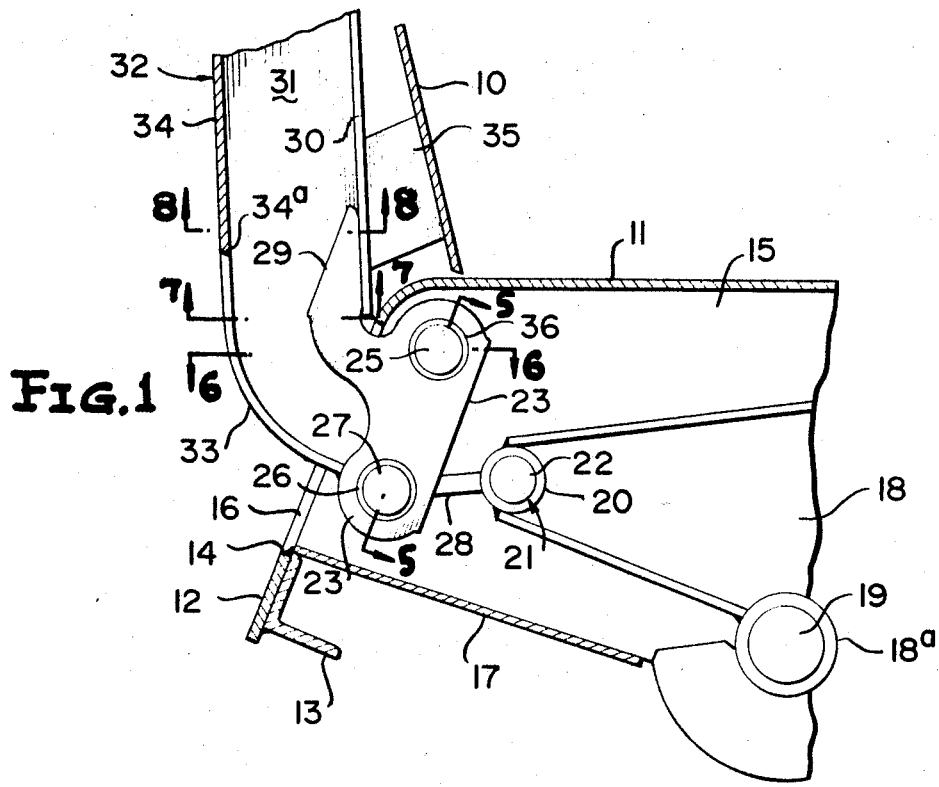
FIGURE 1 is a fragmentary transverse vertical section illustrating the hinge, the section being taken on the line 1—1 of FIGURE 3 with the door closed.
Figure 9:
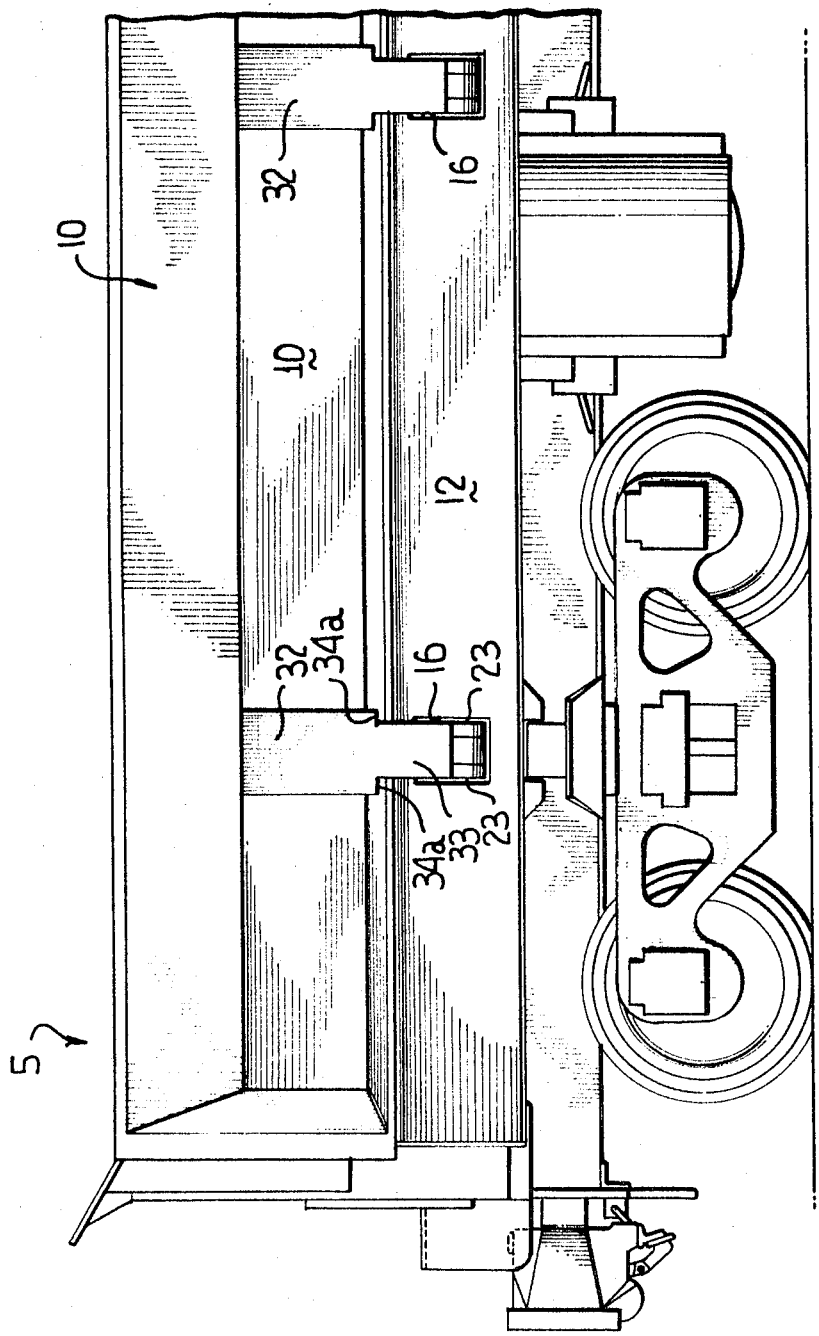
FIGURE 9 is a partial side view of a railway dump vehicle having a hinged down-turning side door construction of this invention.

A portion of the sheet metal bottom 11 of the vehicle body is shown. At the sides this bottom is turned down to form a flaring skirt 12, as best shown in FIGURES 1, 2 and 9. The outer longitudinal edge of the skirt is reinforced by an angle bar brace 13. At the points where hinges are to be provided, the bottom carries spaced vertical depending plates 15. The skirt 12 between each pair of plates 15 is cut away at 16 to form an opening through which the hinge operates.

A skirt aperture reinforcing bottom plate 17 is provided and slopes inwardly beneath and between the plates 15 as viewed in FIGURE 1. A door control device or operating arm 18 incorporating a journal bearing 18a is placed between each pair of the depending plates 15. This receives the usual fulcrum pin 19 extending between and journalled in the depending plates 15. The axis of the fulcrum pin 19 is the one about which the vehicle body is tilted for discharge.

Aligned bearing sleeves 20 are mounted on the end of each operating arm 18 as shown in FIGURES 1 and 2. A pin 21 is provided with end journals 22, 22 which are fitted within the sleeves 20, 20.

Door hinge bosses 23 (FIGURES 3, 4 and 9) are mounted in spaced pairs or sets within the space provided by each cooperating pair of the plates 15. A common bearing sleeve 36 holds a pivot pin 25 connecting the opposite depending plates 15. At each opposite end each of the door hinge bosses 23, 23 has an independent sleeve 26, and these sleeves are in alignment and form journals for a common pin 27. The pin 27 is connected to the pin 21 by means of a link 28, as best shown in FIGURES 1 and 2. Door interlocking and operating apparatus including operating arm means and linkage of the nature of the arm means 18 and linkage 28 is disclosed in my prior Patent 2,826,999, issued Mar. 18, 1958.

Each door hinge boss 23 has a lateral extension 29 which extends out through the aperture 16 in the respective skirt 12. At its end each extension 29 is attached to the inner wall 30 of a box member generally designated 31 said box also including spaced parallel sidewalls and an outer wall 32. The outer wall 32 of the box member is parallel to the inner wall 30 at its upper end as shown in FIGURE 1 but bends in at its lower end 33 for attachment to the lower ends of door hinge bosses 23, 23 as shown in FIGURES 1 and 2.

However, the wall 32 extends beyond the side walls of the box 31 to provide wings 34. These wings are wider than the aperture 16 and present end abutment shoulders 34a. It follows that in the opening movement of the door, the wings 34 move to the position shown in FIGURE 2 wherein their abutment shoulders 34a come to rest on the skirt 12 outside of the opening 16 and opposite skirt aperture reinforcing bottom plate 17, as shown in FIGURE 2. They therefore limit the down-turning movement so that the door proper extends generally in the plane of the tilted vehicle bottom 11, as shown in FIGURE 2.

It is to be understood that the box member generally designated 31 is attached at its upper end, not shown, to the side door structure 10. Spaced from the lower end of both the door structure 10 and the box structure 31, is a reinforcing brace 35. The extra width provided by the wings 34 provides a much more efficient connection to a side door structure than would be possible with a narrower hinge construction.

A structure such as described above for example, has definite advantages in permitting the use of lighter weight sheet metal for the down-turned door. This is possible because of the reinforcing box mounting which terminates at its lower end in suitable hinge members. These hinge members are mounted in pairs and are of heavier than usual plate construction. The mounting of the door is therefore adequately reinforced both in its vertical position and when lowered for discharge. The extent of lowering is limited by the form of the outer wall 32 and its wings 34.

While the preferred form of the invention has been described by way of example, the construction may be varied in minor details of materials, proportions and structural features without departing from the invention.

I claim:

1. In a tilting dump vehicle having a downturning side door, a bottom and a depending bottom skirt with spaced apertures, a hollow reinforcing box defined by an inner wall, an outer wall, and a pair of side walls, said inner, outer and side walls being rigidly secured to each other to form a generally polygonal cross-sectional configuration, said reinforcing box being rigidly connected to the side door opposite and above each aperture, said outer wall of each reinforcing box having its upper portion wider than the apertures of said skirt to present abutment shoulders for movement limiting contact with the skirt laterally of the associate aperture therein, hinge boss means attached to the inner wall and side walls of each reinforcing box, and means for pivoting said hinge boss means to move said side door between the relatively upright and down-turned positions thereof.

2. The dump vehicle as defined in claim 1 wherein said hinge boss means are defined by a pair of hinge bosses associated with each reinforcing box, and each hinge boss is secured in sandwiched relationship between an associated one of said side and inner walls.

3. The dump vehicle as defined in claim 1 including bottom plate means supported beneath said apertures for reinforcing the same adjacent the line of contact of the abutment shoulders laterally of said apertures.

References Cited

UNITED STATES PATENTS

| 2,618,507 | 11/1952 | Peller | 105—272 X |
| 2,826,999 | 3/1958 | Flowers | 105—277 |
| 3,166,022 | 1/1965 | Flowers | 105—276 X |

ARTHUR L. LA POINT, Primary Examiner

HOWARD BELTRAN, Assistant Examiner

U.S. Cl. X.R.

308—22